United States Patent [19]

Barnoach

[11] Patent Number: 5,011,562
[45] Date of Patent: Apr. 30, 1991

[54] APPARATUS FOR FORMING SEALED LENGTHS OF PLASTICS COATED TUBE

[75] Inventor: Itzhak Barnoach, London, England

[73] Assignee: Kitechnology B.V., Amsterdam, Netherlands

[21] Appl. No.: 330,258

[22] Filed: Mar. 29, 1989

[30] Foreign Application Priority Data

Aug. 3, 1988 [GB] United Kingdom ................ 8818464

[51] Int. Cl.$^5$ .......................... B32B 31/18; B21D 9/08
[52] U.S. Cl. ...................... 156/498; 156/198; 425/392; 425/394; 72/304; 72/309; 72/316; 72/318
[58] Field of Search ................ 72/356, 357, 304, 308, 72/309, 316, 318; 425/392, 394; 118/44; 100/226; 156/198, 498, 515

[56] References Cited

U.S. PATENT DOCUMENTS

| | | |
|---|---|---|
| 1,586,249 | 5/1926 | Krogh et al. . |
| 2,461,372 | 2/1949 | Collins . |
| 2,700,408 | 1/1955 | Babbitt . |
| 3,202,563 | 8/1965 | Charvet . |
| 3,280,609 | 10/1966 | Lehnert . |
| 3,376,181 | 4/1968 | Larson et al. . |
| 3,388,017 | 6/1968 | Grimsley et al. . |
| 3,433,043 | 3/1969 | Vermeulen et al. . |
| 3,495,527 | 2/1970 | Lafreniere ............................ 100/226 |
| 3,621,700 | 11/1971 | Wachtell et al. ...................... 72/308 |
| 3,825,393 | 7/1974 | Bittner et al. ......................... 425/392 |
| 4,370,186 | 1/1983 | Blandin et al. . |
| 4,403,491 | 9/1983 | Wassen et al. . |
| 4,404,720 | 9/1983 | Bohannon, Jr. . |
| 4,566,679 | 1/1986 | Ehm et al. ............................. 72/304 |
| 4,817,411 | 4/1989 | Bennett et al. ........................ 72/356 |

FOREIGN PATENT DOCUMENTS

| | | |
|---|---|---|
| 2805735 | 8/1979 | Fed. Rep. of Germany . |
| 3044003 | 6/1982 | Fed. Rep. of Germany . |
| 2434326 | 3/1980 | France . |
| 2463675 | 2/1981 | France . |
| 54-52183 | 4/1979 | Japan . |
| 1169287 | 11/1969 | United Kingdom . |
| 1304879 | 1/1973 | United Kingdom . |
| 2042673 | 12/1979 | United Kingdom . |

*Primary Examiner*—David L. Lacey
*Assistant Examiner*—Todd J. Burns
*Attorney, Agent, or Firm*—Lowe, Price, LeBlanc, Becker & Shur

[57] ABSTRACT

Plastics coated metal tube produced by folding a strip of metal into a tubular form, seaming the tube and immediately extruding layers of plastics material onto the inner and outer surfaces of the metal tube, and cooling the plastics layers by passing the tube through a water bath, contains air injected under pressure to assist adhering the extruded plastics coating onto the inner surface of the metal tube and to test the integrity of the tube. The invention provides apparatus comprising jaws which clamp the tube within the water bath in order to seal the tube while the inner coating is still plastic so that when the tube is cut into lengths at the seals the internal pressure is retained until the tube is eventually used.

5 Claims, 1 Drawing Sheet

APPARATUS FOR FORMING SEALED LENGTHS OF PLASTICS COATED TUBE

TECHNICAL FIELD

This invention relates to apparatus for forming plastics coated metal or metal alloy tube.

Such plastics coated metal or metal alloy tube may be made from a thin aluminum strip which is then coated on both the inner and outer surfaces with a plastics material such as a polyethylene and has many advantageous characteristics. It is light, can be easily bent, has good corrosion resistance, has improved fluid flow characteristics and can be easily connected and jointed.

BACKGROUND ART

This type of plastics coated tube and a method for its manufacture are discussed in U.S. Pat. No. 4,370,186. That document describes a method of manufacture in which a strip of aluminum is folded into a tubular form, seamed, for example by welding, and then passed over a mandrel. Plastics material is then extruded from the mandrel onto the inner surface of the aluminum tube and the tube then passes through a bush where a layer of plastics material is extruded onto the outer surface of the tube. The plastics coatings may then be cooled, for example in a water bath. In addition, European Patent 0024220 and British Patent Application 8625432 describe various aspects of the manufacture of such a plastics coated metal tube.

One preferred feature of the manufacturing procedure is to inject air or other gas under pressure into the tube as it is formed, from a gas line extending through the core of the mandrel. Provided that the leading end of the tube is sealed, a permanent pressure is then created within the tube and this assists not only in laying the extruded plastics coating onto the inner surface of the metal tube, but also in detecting any faults that may have occurred in the welding of the aluminum strip to form the tube. Thus, any faults in the weld will cause air to escape from the tube since the plastics coating on the internal and external surfaces of the coated tube is still relatively soft for a time immediately after being extruded onto the metal tube and the gas pressure within the tube will blow through the soft plastics material at any point where there is a fault in the weld. This escape of gas can be detected by a sensing mechanism which may be provided to sense a drop in pressure within the tube at any point downstream of the welding station, or by the appearance of bubbles of gas escaping from the tube as it passes through the cooling bath.

The leading end of the tube can be sealed quite satisfactorily by pinching and flattening the end while the internal plastics coating is still soft, or by pinching and flattening the end and bending the flattened end back on itself if the internal plastics coating has already cooled.

When the cooled tube is passed to a take up roll the tube needs to be severed only infrequently, generally when the take up roll is full. Accordingly, the operation of pinching and flattening the leading end of the tube is equally infrequent when a take up roll is used. However, when the tube is to be produced in relatively short lengths, it is necessary to effect very frequent severing of the tube and consequential sealing of the new leading end thereby created. This in turn, can lead to frequent release of the gas pressure within the tube and the severe risk that any welding faults which may occur before the new leading end of the tube is sealed and which can be detected with reliability only when the internal and external plastics coatings are still soft, will go undetected.

SUMMARY OF THE INVENTION

The present invention seeks to provide apparatus for sealing lengths of tube that can be severed each from the upstream length of tube without compromising the efficiency of the operation for monitoring the integrity of the weld.

According to the invention, the tube is pinched and flattened during its passage through the cooling bath so that the interior plastics coating of the flattened section of the tube forms a seal between the interiors of the upstream and downstream lengths of tube. Such a procedure can be carried out using apparatus comprising a pair of cooperating jaws which can flatten and seal the tube and travel with the tube through the cooling bath at least until the interior plastics coating has cooled to maintain the seal.

The clamping jaws themselves preferably operate automatically after passage of a predetermined length of tube. In this manner, it is possible to provide predetermined lengths of tube in either roll form or in straight lengths depending upon requirements. In addition, since the lengths of tube are sealed at both ends and the interior of the tube contains air or other gas under pressure, initial cutting of the tube immediately prior to its final installation will be accompanied by a release of that internal pressure which will demonstrate not only the integrity of the tube but also the fact that no foreign material could have found its way into the tube. This latter feature is especially important when the tube is to be used in locations where scrupulous cleanliness is a prerequisite, for example in hospitals, catering establishments and food and drug processing facilities.

The tube can then be severed within the length of the flattened and sealed section, either immediately after release of the sealing jaws or after the tube has left the cooling bath, without the gas pressure within the tube being released. The tube can be severed either manually, using hand operated shears or guillotines, or automatically with a guillotine. Such a guillotine may, for example, be coupled to the operation of the sealing jaws or to a sensor for detecting the approach of the flattened and sealed section of the tube.

BRIEF DESCRIPTION OF THE DRAWINGS

Apparatus according to the invention will now be described in greater detail by way of example only with reference to the accompanying drawings, in which.

BEST MODE FOR CARRYING OUT THE INVENTION

Figure 1:
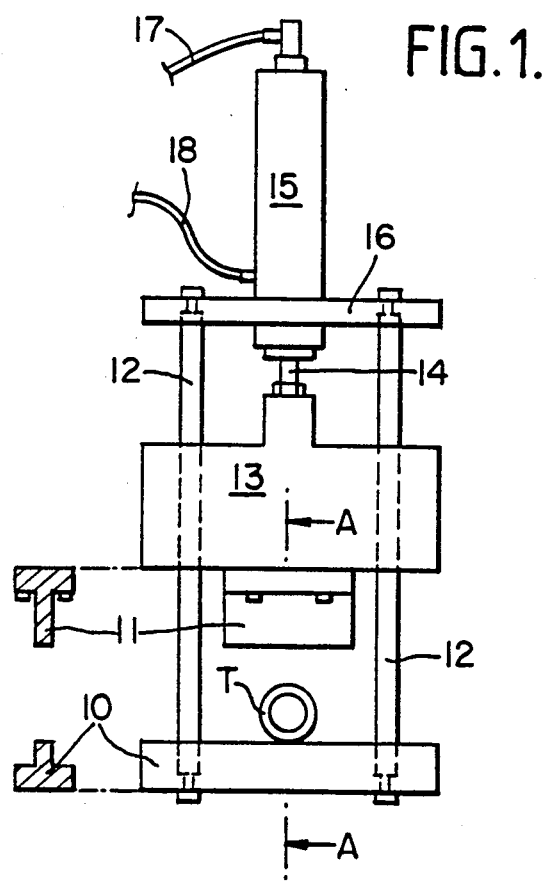
FIG. 1 is an end view of the sealing jaws and associated equipment including a cross-section along line A—A of the jaws to illustrate their shape.

Referring to the drawings, FIG. 1 is an end view of the sealing jaws assembly and includes a fixed lower jaw 10 and a movable upper jaw 11, cross-sectional views of which taken along line A—A are shown to the left of the drawing.

The lower jaw 10 is attached adjacent its ends to a pair of vertical guide posts 12 which pass through a support block 13 for the upper jaw 11 and along which the block 13 can move. The block 13 is mounted on a piston rod 14 of a pneumatic cylinder 15 which in turn is mounted on a tie bar 16 connecting the upper ends of the guide posts 12. The pneumatic cylinder 15 is attached to air lines 17 and 18 for the supply and return, respectively, of compressed air from a control unit (not shown). The tube T is shown in cross-section in its normal position as it moves through the cooling bath, adjacent the lower jaw 10.

Figure 3:
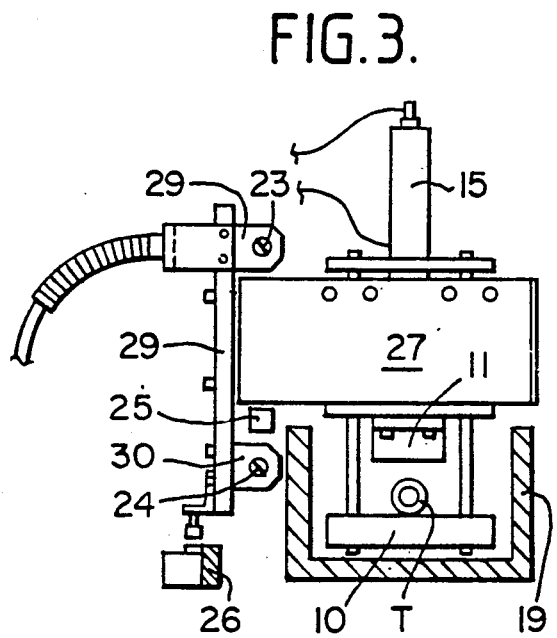
FIG. 3 is a view taken along line B—B of FIG. 2.
Figure 2:
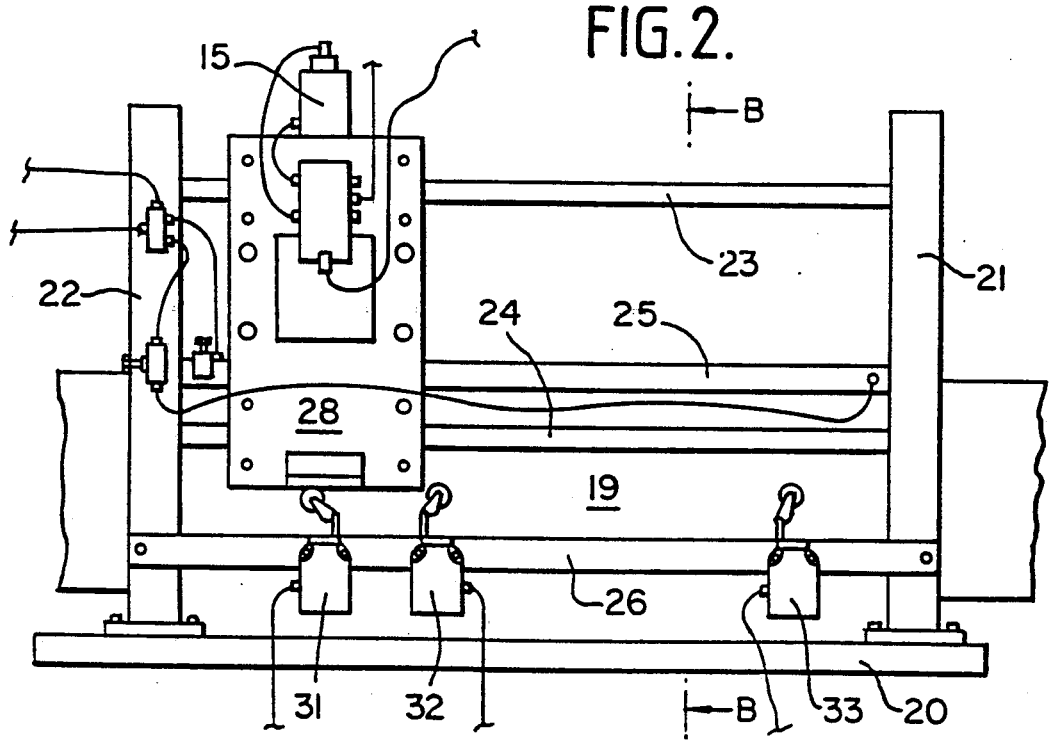
FIG. 2 is a side view of the apparatus complete and in position over a cooling bath.

FIGS. 2 and 3 show the apparatus complete and in position over a cooling bath 19, the bath consisting of an elongate trough containing cold water and through which the tube T passes immediately after being formed. The apparatus is arranged close to the upstream end of the cooling bath 19 so that the internal plastics coating of the tube T will still be in the plastic state when the tube is sealed by the jaws.

The apparatus shown in FIGS. 2 and 3 consists of a base 20 running its full length, which supports a pair of upright members 21 and 22. Mounted horizontally between the upright members 21 and 22 are upper and lower guide rods 23 and 24, respectively, a slide 25 which contains a pneumatic piston, and a limit switch support bar 26. The sealing jaws assembly is attached via clamps around the upper ends of vertical guide posts 12 to a housing front plate 27 which in turn is attached to a side plate 28. Side plate 28 carries pairs of upper and lower guide brackets 29 and 30 which serve to guide the jaws assembly along the length of the cooling bath 19 on the guide rods 23 and 24. Limit switches 31, 32 and 33 are mounted in the support bar 26.

The sealing unit operates as follows. The unit is at rest in the position shown in the drawings, with limit switch 31 actuated. When the associated control logic circuit (not shown) receives a signal from a suitable meter counter (not shown) that the required length of tube has passed through the unit, or when the control logic circuit receives a signal that the unit has been manually actuated, then the slide piston is actuated and moves the unit to the right along the guide rods 23 and 24 until the limit switch 32 is tripped.

Air is then supplied to the sealing unit cylinder 15 which serves to actuate the piston and force the upper jaw downwards towards the lower jaw.

The tube which is travelling through the sealing unit and the bath is at this point undergoing the first stages of its cooling process, and its internal plastics coating is therefore still hot and soft. The clamping action of the jaws therefore deforms the tube to effectively seal the inside of the tube. Once the upper jaw has completed its downward movement, the whole jaw assembly is moved by the tube in the direction of tube travel, i.e. to the right as seen in FIG. 2.

The jaws remain clamped to the tube until a sealing unit timer (not shown) reaches a preset duration or until the sealing unit trips limit switch 33, whichever comes first. During this period, there is sufficient time for the cooling bath to take effect so that when the upper jaw is withdrawn, the interior plastics coating of the tube has solidified sufficiently to enable the tube to retain its deformed profile.

Following withdrawal of the upper jaw, the sealing unit is no longer being pulled along by the tube and the slide piston returns the sealing unit to its rest position over limit switch 31. When the limit switch 31 is actuated, all functions are automatically reset ready for the next sealing operation.

I claim:

1. Apparatus for forming sealed lengths of plastics coated metal tube, said tube being a folded tubular strip of metal having longitudinal edges sealed together and extruded plastics material on inner and outer surfaces of the metal tube and containing a gas under pressure, the apparatus comprising a cooling bath having an inlet and an opposed outlet for passage of the tube through a cooling liquid adapted to cool the plastics material; clamping jaw means within the bath for clamping around to flatten and seal the tube; and control means positioned and arranged with respect to said clamping jaw means so as to (1) provide the actuating of said clamping jaw means at a first station adjacent the inlet to the bath, and (2) move said jaws along the bath with the tube clamped in said jaw means at a rate such that said jaw means exert no pulling action on the tube, and (3) release said jaw means from the tube upon reaching a second station downstream of the first station, and (4) return said jaw means to the first station.

2. Apparatus according to claim 1, wherein the jaw means comprise a fixed lower jaw and a movable upper jaw.

3. Apparatus according to claim 1 wherein the jaw means are operated pneumatically under control of the control means.

4. Apparatus according to claim 1 further comprising, downstream of the second station, a guillotine adapted to sever the tube within the limits of its flattened and sealed length.

5. The apparatus of claim 4, wherein said guillotine is disposed downstream from the cooling bath outlet.

* * * * *